(12) United States Patent
Jung et al.

(10) Patent No.: US 8,988,617 B2
(45) Date of Patent: Mar. 24, 2015

(54) STEREOSCOPIC IMAGE DISPLAY DEVICE AND METHOD FOR DRIVING THE SAME

(75) Inventors: Sungmin Jung, Incheon (KR); Hyunjin Park, Paju-si (KR); Jonghoon Woo, Goyang-si (KR); Wookeun Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 463 days.

(21) Appl. No.: 12/913,008

(22) Filed: Oct. 27, 2010

(65) Prior Publication Data

US 2011/0115994 A1 May 19, 2011

(30) Foreign Application Priority Data

Nov. 13, 2009 (KR) ........................ 10-2009-0109854

(51) Int. Cl.
*G02F 1/133* (2006.01)
*H04N 13/04* (2006.01)
*G09G 3/00* (2006.01)
*G09G 3/34* (2006.01)

(52) U.S. Cl.
CPC ........... *H04N 13/0486* (2013.01); *G09G 3/003* (2013.01); *G09G 3/3426* (2013.01); *G09G 2300/023* (2013.01); *G09G 2310/024* (2013.01); *G09G 2310/061* (2013.01); *H04N 13/0438* (2013.01)
USPC .......................................................... 349/15

(58) Field of Classification Search
USPC .......................................................... 349/15
See application file for complete search history.

(56) References Cited

U.S. PATENT DOCUMENTS

| 7,453,529 | B2 * | 11/2008 | Nam et al. | 349/15 |
|---|---|---|---|---|
| 7,733,296 | B2 * | 6/2010 | Lee et al. | 345/6 |
| 7,961,260 | B2 * | 6/2011 | Huang et al. | 349/15 |
| 2008/0316303 | A1 * | 12/2008 | Chiu et al. | 348/51 |

FOREIGN PATENT DOCUMENTS

| JP | 2008-209476 | 9/2008 |
|---|---|---|
| JP | 2009526277 A | 7/2009 |
| KR | 20070099143 A | 10/2007 |
| WO | WO 2011017713 A2 | 2/2011 |
| WO | WO 2011017714 A2 | 2/2011 |

OTHER PUBLICATIONS

Office Action issued in corresponding United Kingdom Patent Application No. GB1014379.0, mailed Nov. 26, 2010.
Office Action issued in corresponding United Kingdom Patent Application No. GB1014379.0, mailed Nov. 30, 2011.
Office Action issued in corresponding Korean Patent Application No. 10-2009-0109854, mailed Nov. 12, 2012.

\* cited by examiner

*Primary Examiner* — James Dudek
(74) *Attorney, Agent, or Firm* — Brinks Gilson & Lione

(57) ABSTRACT

A stereoscopic image display device comprises a liquid crystal panel alternately displaying a first image and a second image, the first and second images being changed at first transition durations every frame, a polarization control panel disposed on the liquid crystal panel and changing polarization states at second transition durations, polarization glasses enabling the displayed first and second images to be viewed via the polarization control panel, and a backlight unit providing light to the liquid crystal panel and having black durations where the light is not provided to the liquid crystal panel.

10 Claims, 12 Drawing Sheets

(a)            (b)

STEREOSCOPIC IMAGE DISPLAY DEVICE AND METHOD FOR DRIVING THE SAME

This application claims the benefit of Korea Patent Application No. 10-2009-0109854, filed on Nov. 13, 2009, the entire contents of which is incorporated herein by reference for all purposes as if fully set forth herein.

BACKGROUND

1. Field of the Invention

This document relates to a stereoscopic image display device and a method for driving the same.

2. Discussion of the Related Art

Stereoscopic image display devices are generally classified into display devices of employing a stereoscopic technique and display devices of employing an autostereoscopic technique.

The stereoscopic technique uses binocular parallax images which are great in the stereoscopic effect. There are two types of stereoscopic techniques: one type uses glasses; and another type does not use glasses. Presently, the two types have been put to practical use. In the type which uses glasses (hereinafter, referred to as a "glasses type"), binocular parallax images are displayed on a direct view display panel or a projector by changing polarization directions or in the temporal division manner, and polarization glasses or liquid crystal shutter glasses are used to implement stereoscopic images. In the type of which does not use glasses, the stereoscopic images are implemented by dividing optical axes of binocular parallax images, by using optical plates such as parallax barriers provided at front and rear surfaces of a display panel.

In the glasses type, a polarization control panel (or a retarder) for conversion of polarization characteristics of light is disposed between the display panel and the polarization glasses. In the glasses type, images for the left eye (hereinafter, also referred to as "left eye images") and images for the right eye (hereinafter, also referred to as "right eye images") are alternately displayed on the display panel, and their polarization characteristics are altered when incident to the polarization glasses via the polarization control panel. Thus, the left eye images and the right eye images are displayed by the temporal division in the glasses type, thereby implementing stereoscopic images without degradation of a resolution.

However, the glasses type employing the liquid crystal shutter glasses in the related art has a problem in that a crosstalk occurs at durations where the left eye images and the right eye images are not completely divided due to the low response speed of the polarization control panel. Therefore, in the glasses type employing the liquid crystal shutter glasses in the related art, in order to completely divide the images, it is required to remove the durations where the left eye images and the right eye images are coupled.

BRIEF SUMMARY

According to an exemplary embodiment of this disclosure, there is provided a stereoscopic image display device comprising a liquid crystal panel alternately displaying a first image and a second image, the first and second images being changed at first transition durations every frame, a polarization control panel disposed on the liquid crystal panel and changing polarization states at second transition durations, polarization glasses enabling the displayed first and second images to be viewed via the polarization control panel, and a backlight unit providing light to the liquid crystal panel and having black durations where the light is not provided to the liquid crystal panel.

According to another exemplary embodiment of this disclosure, there is provided a method for driving a stereoscopic image display device which comprises a liquid crystal panel alternately displaying a first image and a second image, the first and second images being changed at first transition durations every frame, a polarization control panel disposed on the liquid crystal panel and changing polarization states at second transition durations, and polarization glasses enabling the displayed first and second images to be viewed via the polarization control panel and changing polarization states at third transition durations, the method comprising controlling a backlight unit to have black durations where light is not provided to the liquid crystal panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Detailed contents for practicing this document will now be described with reference to the accompanying drawings.

Figure 1:
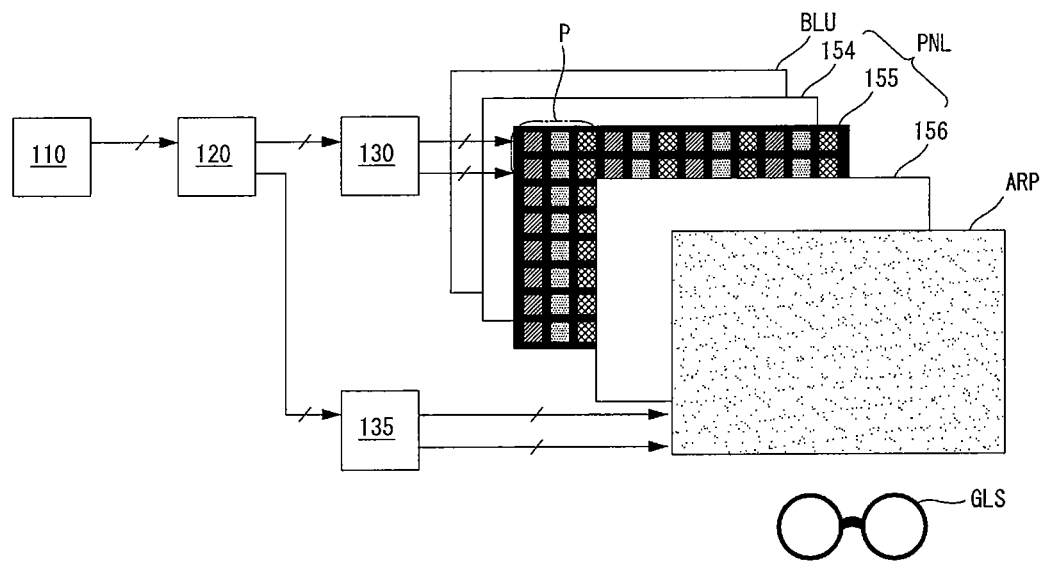
FIG. 1 is a schematic diagram illustrating a configuration of a stereoscopic image display device according to an embodiment of this disclosure.
Figure 2:
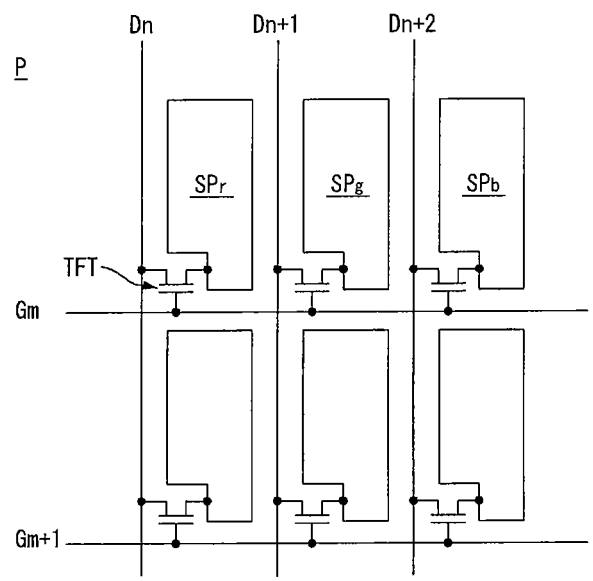
FIG. 2 is a diagram illustrating a configuration of subpixels in the display panel shown in FIG. 1.
Figure 3:
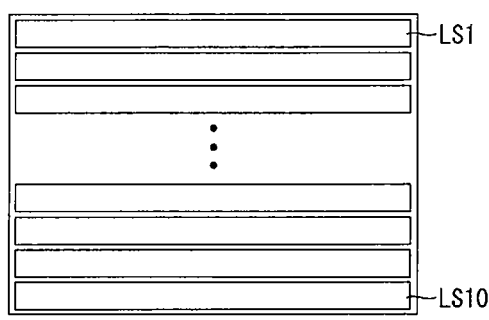
FIG. 3 is a diagram illustrating a configuration of light sources of the backlight unit shown in FIG. 1.
Figure 4:
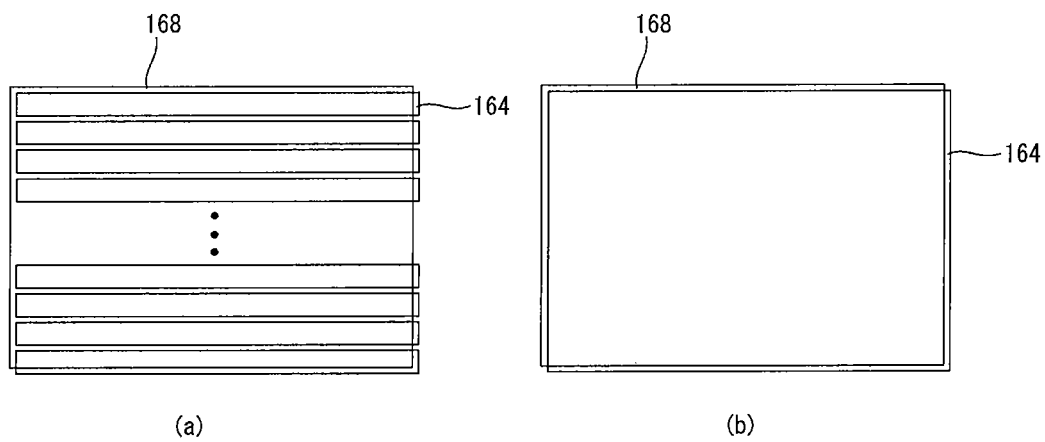
FIGS. 4A and 4B are diagrams illustrating configurations of electrodes of the polarization control panel shown in FIG. 1.

FIG. 1 is a schematic diagram illustrating a configuration of a stereoscopic image display device according to an embodiment of this disclosure, and FIG. 2 is a diagram illustrating a configuration of subpixels of the display panel shown in FIG. 1. FIG. 3 is a diagram illustrating a configuration of light sources of the backlight unit shown in FIG. 1, and FIGS. 4A and 4B are diagrams illustrating configurations of electrodes of the polarization control panel shown in FIG. 1.

Referring to FIGS. 1 to 4, a stereoscopic image display device according to an embodiment of this disclosure comprises an image supply unit 110, a controller 120, a first driver 130, a second driver 135, a liquid crystal panel PNL which is an example of the display panel, a backlight unit BLU, a polarization control panel ARP, and polarization glasses GLS.

The image supply unit 110 supplies to the controller 120, image frame data of two-dimensional ("2D") format in a 2D mode and image frame data of three-dimensional ("3D") format in a 3D mode. Further, the image supply unit 110 supplies image frame data to the controller 120. The image supply unit 110 also supplies to the controller 120 timing signals such as a vertical synchronization signal Vsync, a horizontal synchronization signal Hsync, a data enable signal DE, a main clock, a low potential voltage GND, and so forth. The image supply unit 110 selects the 2D mode or 3D mode by a user's selection input via a user interface. The user interface comprises a user input device such as an OSD (on screen demand), a remote controller, a keyboard, a mouse or the like.

The controller 120 supplies an [n]th image frame data and a [n+1]th image frame data to the liquid crystal panel PNL. The [n]th image frame data may be selected as image data for the left eye (hereinafter, also referred to as "left eye image data") and the [n+1]th image frame data may be selected as image data for the right eye (hereinafter, also referred to as "right eye image data"). The controller 120 converts a frame frequency of the image frame data from the image supply unit 110 into a frame frequency of 60×n (where n is a positive integer of two or more) Hz, for example, a frame frequency of 120 Hz, for supply to the first driver 130. The controller 120 alternately supplies left eye image frame data and right eye image frame data to the first driver 130 in the 3D mode. In addition, the controller 120 multiplies the frame frequency of input images by n, thereby increasing frequencies of timing control signals for controlling operation timings of the first and second drivers 130 and 135. The controller 120 controls the second driver 135 such that voltages for scan lines 164 (see FIG. 4) formed in the polarization control panel ARP are changed from a first driving voltage to a second driving voltage when left eye frame images and right eye frame images are mutually changed in the liquid crystal panel PNL.

The first driver 130 includes a data driving circuit connected to data lines Dn to Dn+2, and a gate driving circuit connected to gate lines Gm and Gm+1. Under the control of the controller 120, the first driver 130 converts the digital image frame data from the controller 120 into analog image frame data with positive and negative polarities so as to be supplied to the data lines Dn to Dn+2. The first driver 130 sequentially supplies scan pluses (or gate pulses) to the gate lines Gm and Gm+1 under the control of the controller 120.

The second driver 135 shifts switching voltages Von and Voff supplied to the scan lines 164 along boundaries of the left eye image frame data and the right eye image frame data displayed on the liquid crystal panel PNL. The second driver 135 may be implemented by a multiplexer array which selects a switching voltage Voff synchronized with the left eye image frame data and a switching voltage +Von/−Von synchronized with the right eye image frame data. Also, the second driver 135 may be implemented by a shift register, and a level shifter for shifting outputs from the shift register to the switching voltages Voff and +Von/−Von; moreover, it may be implemented by any analog/digital circuits capable of sequentially supplying the switching voltages Voff and +Von/−Von to the scan lines 164 in the polarization control panel ARP.

The liquid crystal panel PNL alternately displays an [n]th image corresponding to the [n]th image frame data in an [n]th frame period and a [n+1]th image corresponding to the [n+1]th image frame data in a [n+1]th frame period. The liquid crystal panel PNL comprises a thin film transistor ("TFT") substrate and a color filter substrate 155. A liquid crystal layer is disposed between the TFT substrate and the color filter substrate 155. As shown in FIG. 2, the data lines Dn to Dn+2 and the gate lines Gm and Gm+1 are formed to intersect each other on the TFT substrate, and subpixels Spr, SPg and Spb, which are respectively defined by the data lines Dn to Dn+2 and the gate lines Gm and Gm+1, are arranged in a matrix. TFTs formed at the respective intersections of the data lines Dn to Dn+2 and the gate lines Gm and Gm+1 transmit, to pixel electrodes of liquid cells, data voltages transmitted via the data lines Dn to Dn+2, in response to the scan pulses from the gate lines Gm and Gm+2. For this, gate electrodes of the TFTs are connected to the gate lines Gm and Gm+1, and source electrodes thereof are connected to the data lines Dn to Dn+2. Drain electrodes of the TFTs are connected to the pixel electrodes of the liquid crystal cells. Common electrodes opposite to the pixel electrodes are applied with common voltages. The color filter substrate is provided with black matrices and color filters. The common electrodes are formed on the color filter substrate in a vertical filed driving type such as a twisted nematic (TN) mode and a vertical alignment (VA) mode, and they are formed on the TFT substrate along with the pixel electrodes in a horizontal field driving type such as an in plane switching (IPS) mode and a fringe field switching (FFS) mode. Polarizers 154 and 156 are respectively attached to the outer surfaces of the color filter substrate and the TFT substrate 155 of the liquid crystal panel PNL. The upper polarizer 156 has the same light absorption axis as the left eye polarization filter of the polarization glasses GLS, and determines by the light absorption axis a polarization characteristic of a light incident to the polarization control panel ARP. The lower polarizer 154 determines a polarization characteristic of a light incident to the liquid crystal panel PNL. Spacers used to maintain a cell gap of the liquid crystal layer are disposed between the color filter substrate and the TFT substrate 155 of the liquid crystal panel PNL. A liquid crystal mode for the liquid crystal panel PNL may be implemented by any other liquid crystal mode as well as the TN mode, the VA mode, the IPS mode, and the FFS mode.

The backlight unit BLU, which comprises light sources LS1 to LS10 emitting light, has a light emission duration (or light emission band) where light is provided to the liquid crystal panel PNL and a black duration (or black band) where the light is not provided to the liquid crystal panel PNL in order to display images corresponding to the image frame data on the liquid crystal panel PNL. The light provided from the backlight unit BLU is linearly polarized or circularly polarized in the liquid crystal panel PNL for emission. The light sources LS1 to LS10 of the backlight unit BLU may be implemented by any one of a cold cathode fluorescent lamp (CCFL), a hot cathode fluorescent lamp (HCFL), an external electrode fluorescent lamp (EEFL), and a light emitting diode (LED), but not limited thereto. The light sources LS1 to LS10 of the backlight unit BLU is configured to form the black duration where the light is not provided (In other words, where the light is omitted), by block unit. For this configuration, the light sources LS1 to LS10 of the backlight unit BLU may be grouped by at least ten blocks, but not limited thereto. That is to say, the number of blocks is at least ten. For example, when the number of the light sources is twenty and the light sources are grouped by ten blocks, each block includes two light sources. As such, if the light sources LS1 to LS10 of the backlight unit BLU are grouped by at least ten blocks, it is possible to perform a smooth scanning when the black duration is generated by block unit.

The polarization control panel ARP is disposed on the liquid crystal panel PNL and alters the polarization state of the light to be orthogonal to each other every frame period. The polarization control panel ARP alters the light emitted from the liquid crystal panel PNL to have a first polarization state in response to the first driving voltage during the [n]th frame period, and alters the light emitted from the liquid crystal panel PNL to have a second polarization state in response to the second driving voltage during the [n+1]th frame period. For example, the polarization control panel ARP comprises an upper transparent substrate and a lower transparent substrate opposite to each other with a liquid crystal layer therebetween. In the polarization control panel ARP, as shown in FIG. 4(a), the upper transparent substrate is provided with a common electrode 168, and the lower transparent substrate is provided with the scan lines 164 which are divided in a stripe. However, the polarization control panel ARP may have the common electrode and the scan line 164 formed as shown in FIG. 4(b). In the case where the electrode structure of the polarization control panel ARP is formed as shown in FIG. 4(a), the scan lines 164 in the polarization control panel ARP are divided and positioned in the same direction so as to have a correspondence relationship of 1 to N (where N is an even number) with respect to the gate lines Gm and Gm+1 in the liquid crystal panel PNL. For example, when the number of the gate lines Gm and Gm+1 in the liquid crystal panel PNL is 1080 and the number of the scan lines 164 in the polarization control panel ARP is 90, they are formed such that one scan line corresponds to twelve gate lines. The liquid crystal layer disposed between the lower transparent substrate and the upper transparent substrate may be implemented by, for example, a TN having a wave guide, an ECB (electrically controlled birefringence) having a half wave plate (λ/2), a VA having the half wave plate, an HAN (hybrid aligned nematic), an OCB (optically compensated bend) having the half wave plate, or the like. The common electrode 168 is applied with a voltage equal to a common voltage applied to common electrodes in the liquid crystal panel PNL. The scan lines 164 are applied with the voltage Voff with the same level as the common voltage before (or after) the liquid crystal panel PNL displays a right eye frame image (or a left eye frame image) by applying the scan pulses to the gate lines corresponding to the scan lies 164. In addition, the scan lines 164 are alternately applied with the positive and negative voltages +Von and −Von with a predetermined difference with the common voltage before (or after) the liquid crystal panel PNL displays a left eye frame image (or a right eye frame image) by applying the scan pluses to the gate lines corresponding to the scan lines 164. Therefore, the switching voltages +Von, −Von and Voff of three levels are applied to the scan lines 164 so as to view the left eye and right eye frame images displayed on the liquid crystal panel PNL via the polarization glasses GLS. The positive and negative voltages +Von and −Von higher and lower than the common voltage prevents the deterioration of the liquid crystal molecules due to a DC bias.

The polarization glasses GLS are for viewing images displayed on the liquid crystal panel PNL via the polarization control panel ARP. The polarization glasses comprise a left glass and a right glass which have light absorption axes different from each other and thus have polarization characteristics different from each other. The polarization glasses GLS may be configured in various manners depending on the polarization characteristics of the liquid crystal panel PNL and the polarization control panel ARP.

Hereinafter, the stereoscopic image display device according to an embodiment of this disclosure will be described more in detail.

Figure 5:
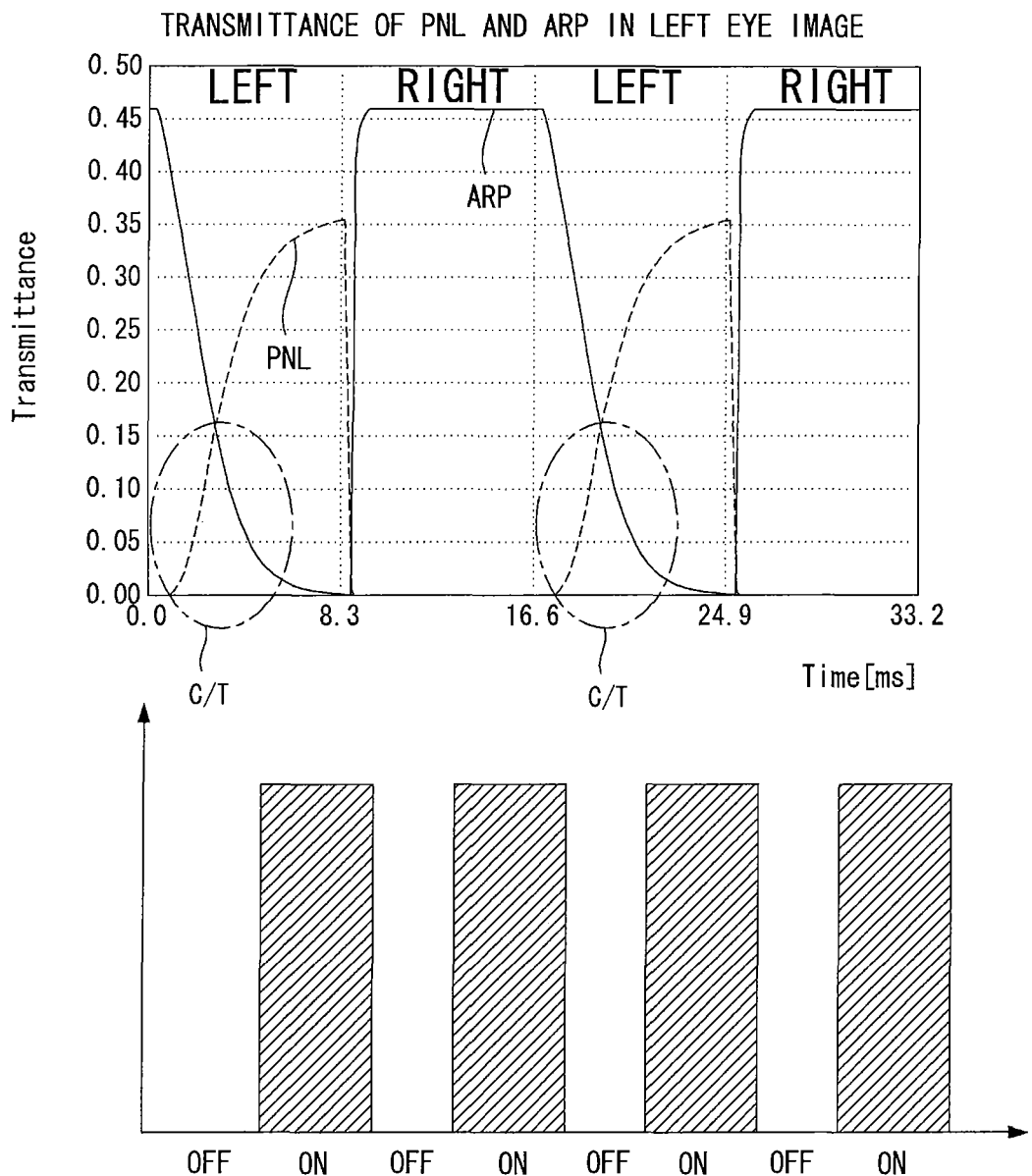
FIGS. 5 and 6 are diagrams illustrating light emission states of the backlight unit in accordance with transmittances of the liquid crystal panel and the polarization control panel, respectively.
Figure 6:
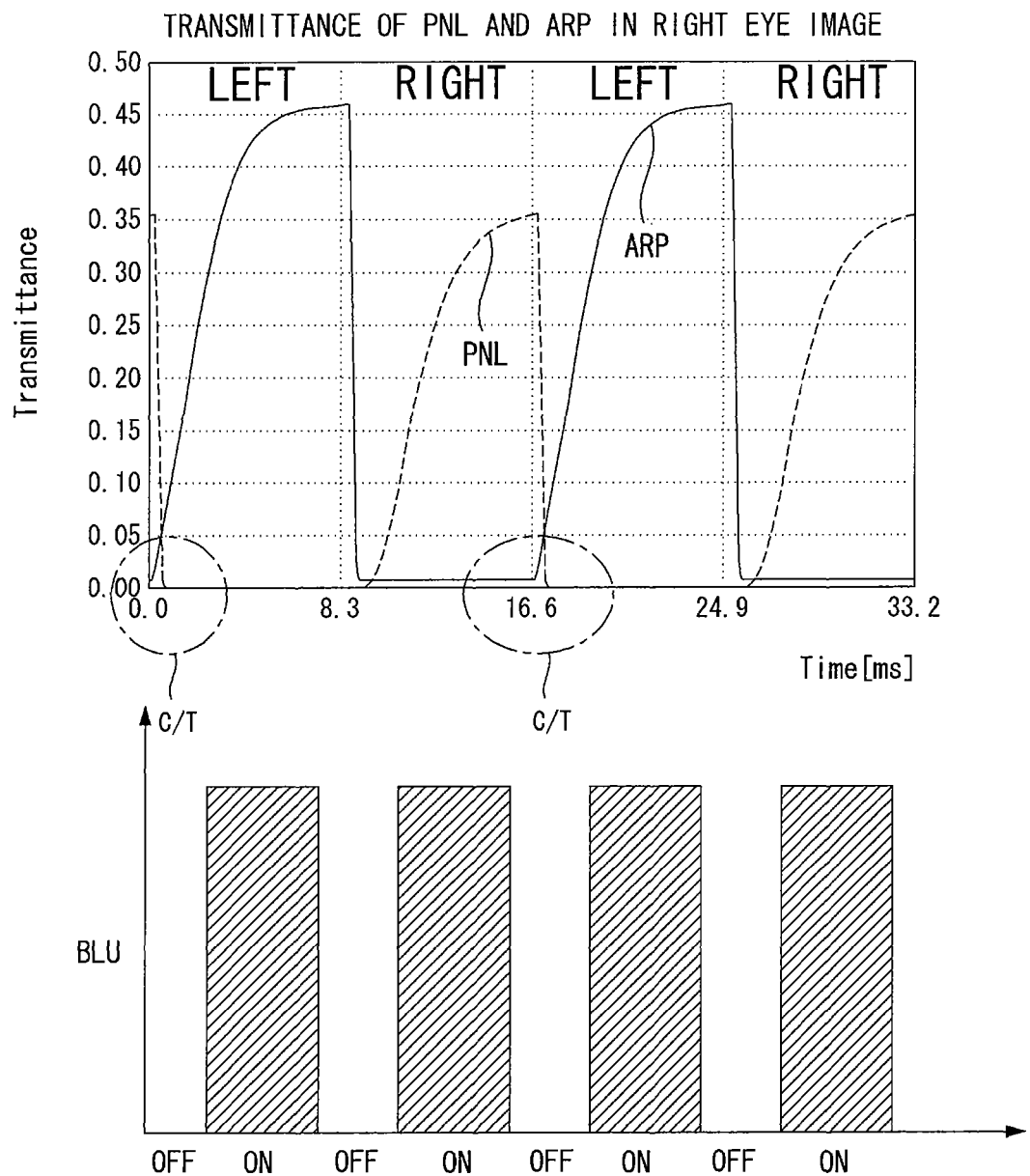

FIGS. 5 and 6 are diagrams illustrating light emission states of the backlight unit in accordance with transmittances of the liquid crystal panel and the polarization control panel, respectively.

Referring to FIGS. 5 and 6, the transmittances are shown when images displayed on the liquid crystal panel PNL are changed from a left eye image to a right eye image, or from a right eye image to a left eye image, and when polarization states of the polarization control panel ARP are changed from a left eye polarization to a right eye polarization, or from a right eye polarization to a left eye polarization.

For example, when an image corresponding to the [n]th image frame data and displayed on the liquid crystal panel PNL is a left eye image LEFT, the polarization state of the polarization control panel ARP is changed to the left eye polarization to transmit the left eye image LEFT. On the other hand, when an image corresponding to the [n+1]th image frame data and displayed on the liquid crystal panel PNL is a right eye image RIGHT, the polarization state of the polarization control panel ARP is changed to the right eye polarization to transmit the right eye image RIGHT. During this procedure, the transition from the left eye image to the right eye image occurs in the liquid crystal panel PNL, and the transition from the left eye polarization to the right eye polarization occurs in the polarization control panel ARP.

As can be seen from FIGS. 5 and 6, in the stereoscopic image display device, the crosstalk C/T may be generated due to the liquid crystal panel PNL or the polarization control panel ARP, or the like. In other words, the crosstalk C/T may be generated for various reasons. For example, the crosstalk C/T may be generated due to the coupling between two images, or may be generated because a response speed of the polarization control panel ARP is low and thereby the left eye image and the right eye image are not completely divided. Generally, in the stereoscopic image display device in the related art, the backlight unit BLU continues to be turned on (the turned-on state is denoted by ON in the figures). In contrast, in the stereoscopic image display device according to this embodiment, there is the black duration where the backlight unit BLU is turned off (the turned-off state is denoted by OFF in the figures) for a constant time so as not to provide light, at the durations where the crosstalk C/T is generated and which corresponds to at least one of the transition durations in the liquid crystal panel PNL and the polarization control panel ARP. After the transitions in the liquid crystal panel PNL and the polarization control panel ARP, there is the light emission durations where the backlight unit BLU is turned on.

An operation of the stereoscopic image display device according to an embodiment of this disclosure will be described more in detail.

Figure 7:
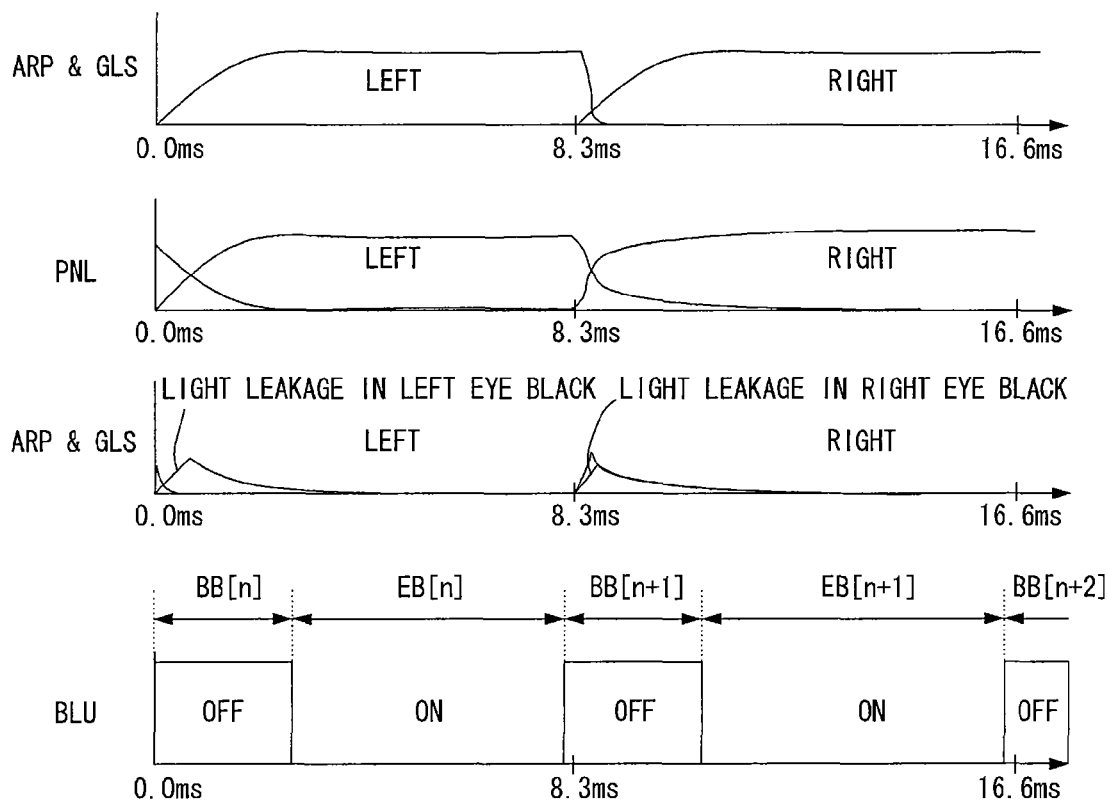
FIGS. 7 and 8 are waveform diagrams illustrating operations of the stereoscopic image display device according to an embodiment of this disclosure.
Figure 8:
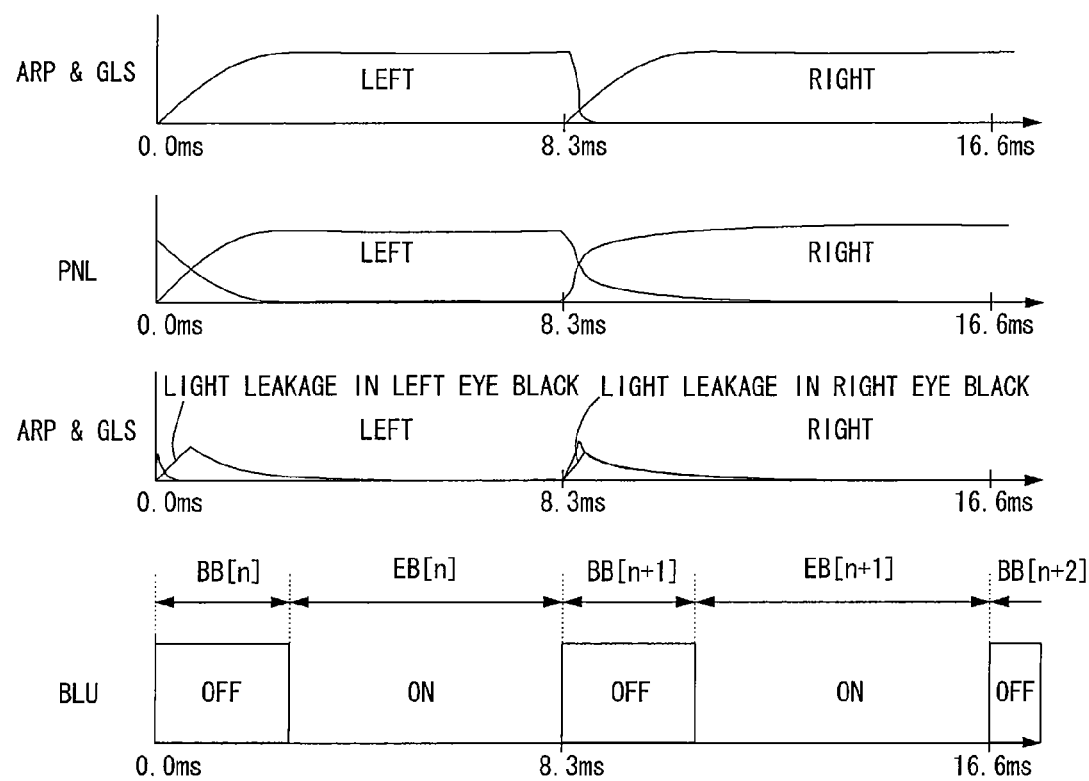
Figure 9:
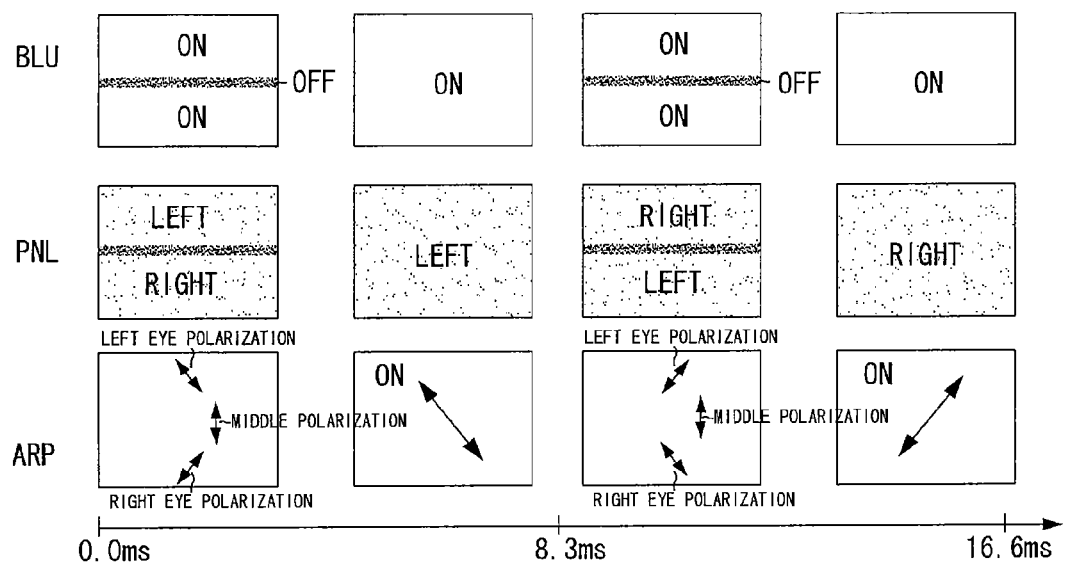
FIG. 9 is a diagram illustrating an operation state of the stereoscopic image display device.
Figure 10:
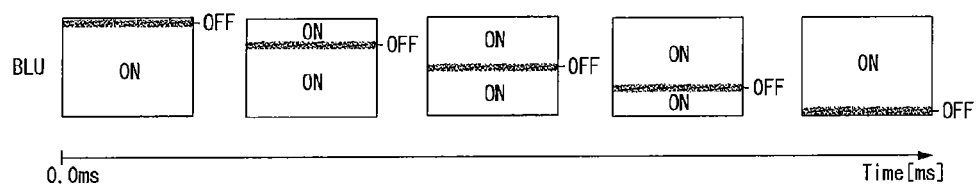
FIG. 10 is a diagram illustrating an operation state of the backlight unit.
Figure 11:
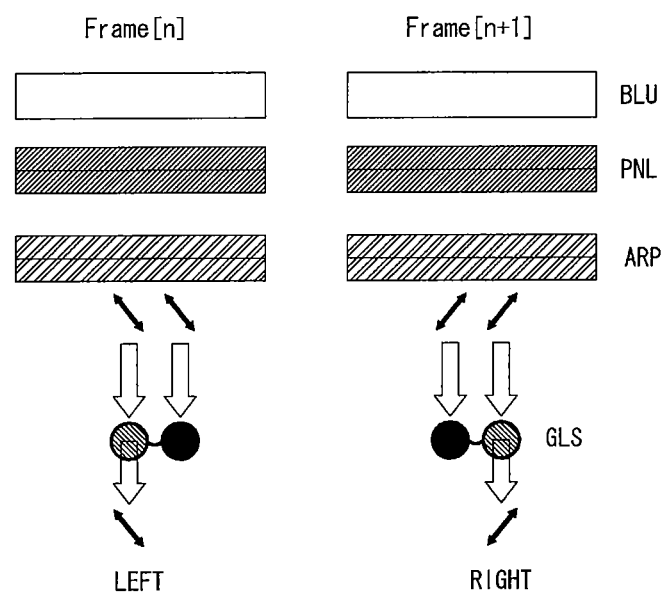
FIG. 11 is a diagram illustrating an operation of the stereoscopic image display device.

FIGS. 7 and 8 are waveform diagrams illustrating operations of the stereoscopic image display device according to an embodiment of this disclosure, and FIG. 9 is a diagram illustrating an operation state of the stereoscopic image display device. FIG. 10 is a diagram illustrating an operation state of the backlight unit, and FIG. 11 is a diagram illustrating an operation of the stereoscopic image display device.

Referring to FIGS. 7 and 8, when the left eye image LEFT and the right eye image RIGHT are displayed on the liquid crystal panel PNL, the procedures are shown in which the polarization states of the polarization control panel and polarization glasses ARP & GLS are also changed from the left eye polarization LEFT to the right eye polarization RIGHT. At this time, as shown in the figures, light leakage occurs in a left eye black and a right eye black at the transition durations in the polarization control panel and polarization glasses ARP & GLS. As such, the durations where the light leakage occurs correspond to the durations where the crosstalk C/T occurs. Therefore, the black durations BB[n] to BB[n+2] where the backlight unit BLU is turned off also correspond to the durations where the light leakage occurs in the polarization control panel and polarization glasses ARP & GLS. Accordingly, as shown in FIGS. 7 and 8, in line with the durations where the crosstalk C/T is generated, the backlight unit BLU is driven to have the black durations BB[n] to BB[n+2] where the backlight unit BLU is turned off and the light emission durations EB[n] and EB[n+1] where the backlight unit BLU is turned on.

Meanwhile, as shown in FIG. 7, the black durations BB[n] to BB[n+2] may be positioned immediately before the images displayed on the liquid crystal panel PNL are changed and immediately before the polarization state of the polarization control panel ARP is changed. In addition, as shown in FIG. 8, the black durations BB[n] to BB[n+2] may be positioned at the moment when the images displayed on the liquid crystal panel PNL are changed and the moment when the polarization state of the polarization control panel ARP is changed. In addition, the black durations BB[n] to BB[n+2] correspond to the durations where the crosstalk C/T is generated and can be adjusted by a predetermined time (±Δ) depending on at least one characteristic of the liquid crystal panel PNL, the polarization control panel ARP, and the polarization glasses GLS.

In FIG. 9, an example is shown in which the backlight unit BLU is turned off for a constant time so as not to provide light at durations where the polarization state of the polarization control panel ARP is changed to a middle polarization between the left eye polarization and the right eye polarization. As shown in the figure, an image displayed on the liquid crystal panel PNL is changed to the left eye image LEFT and the polarization state of the polarization control panel ARP is changed to the left eye polarization, and thereafter the backlight unit BLU is turned on so as to provide light to the liquid crystal panel PNL.

As described in FIGS. 5 to 9, the black durations BB[n] to BB[n+2] in this embodiment correspond to at least one of the durations where the image displayed on the liquid crystal panel PNL is changed and the durations where the polarization state of the polarization control panel ARP is changed. Also, the black durations BB[n] to BB[n+2] correspond to the durations where the light leakage occurs in the polarization control panel and polarization glasses ARP & GLS. Further, the black durations BB[n] to BB[n+2] correspond to the middle polarization durations where the polarization state of the polarization control panel ARP is positioned between the left eye polarization and the right eye polarization.

Meanwhile, the black durations BB[n] to BB[n+2] may be moved along the scan direction in the liquid crystal panel PNL. As described in FIGS. 5 to 9, the black durations BB[n] to BB[n+2] where the backlight unit BLU is turned off may be moved along the scan direction in the liquid crystal panel PNL, as shown in FIG. 10. As described above, the light sources LS1 to LS10 of the backlight unit BLU may be grouped by at least ten blocks. Thereby, the black durations BB[n] to BB[n+2] in the backlight unit BLU can be moved by block unit when moved along the scan direction in the liquid crystal panel PNL. In this structure of the backlight unit BLU where the black durations BB[n] to BB[n+2] are formed by block unit, the black durations BB[n] to BB[n+2] can be scanned smoothly and can be moved along the scan direction in the liquid crystal panel PNL. The backlight unit BLU is synchronized with at least one of the liquid crystal panel PNL and the polarization control panel ARP, and turned on and turned off to have the black durations BB[n] to BB[n+2].

In the stereoscopic image display device with the above-described configuration, for example, as shown in FIG. 11, the backlight unit BLU, the liquid crystal panel PNL, and the polarization control panel ARP are operated such that the left eye image LEFT is transmitted during the [n]th frame period Frame[n] and the right eye image RIGHT is transmitted during the [n+1]th frame period Frame[n+1]. Thereby, due to the black durations BB[n] to BB[n+2] set to correspond to the durations where the crosstalk C/T is generated, an influence by the crosstalk C/T is removed and thus a user can view orthoscopic images without the coupling of images via the polarization glasses GLS.

Hereinafter, the crosstalk improvement in the stereoscopic image display device according to an embodiment of this disclosure will be further described with reference to simulation waveform diagrams.

Figure 12:
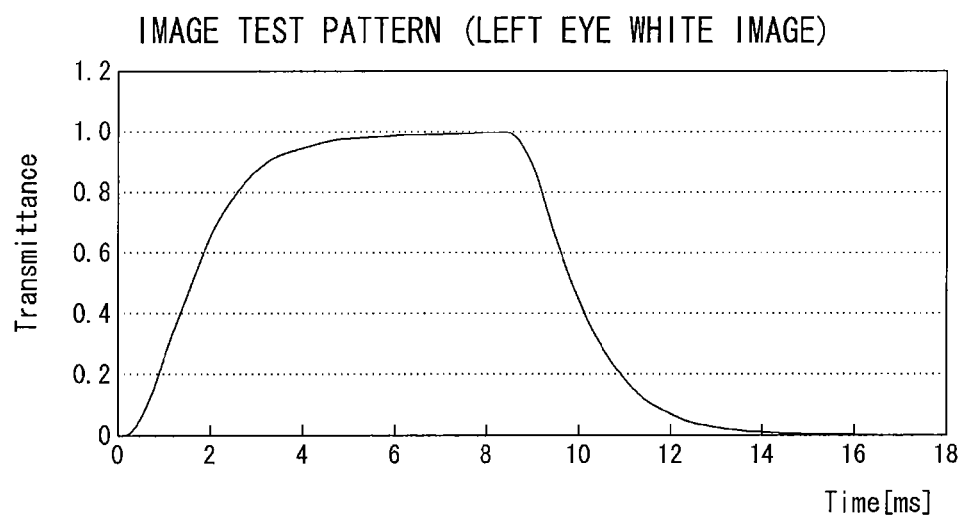
FIGS. 12 and 13 are simulation waveform diagrams illustrating switching response curves of the polarization glasses with respect to image test patterns displayed on the liquid crystal panel.
Figure 12:
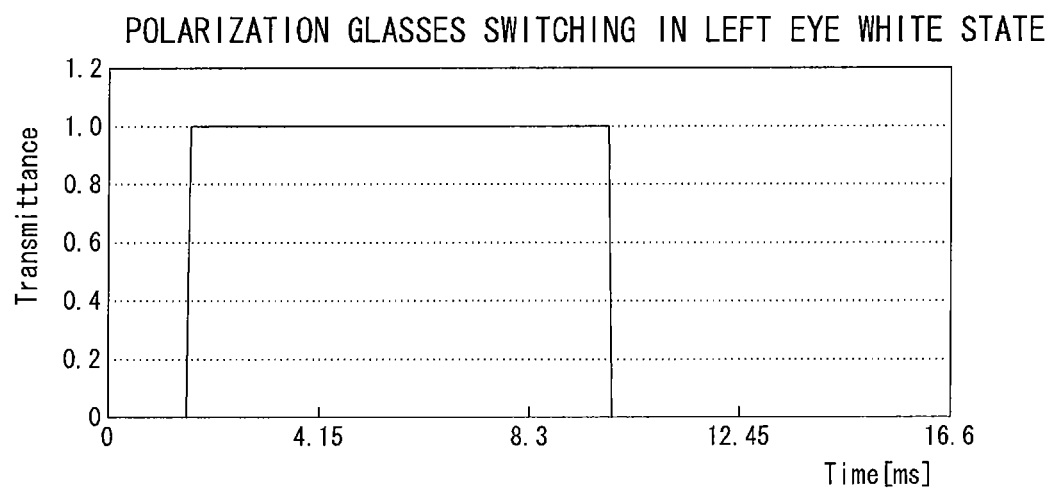
Figure 13:
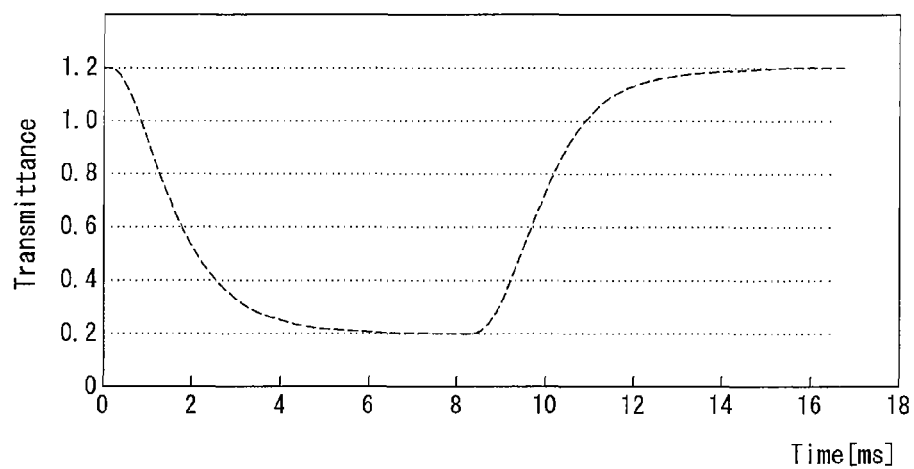
Figure 13:
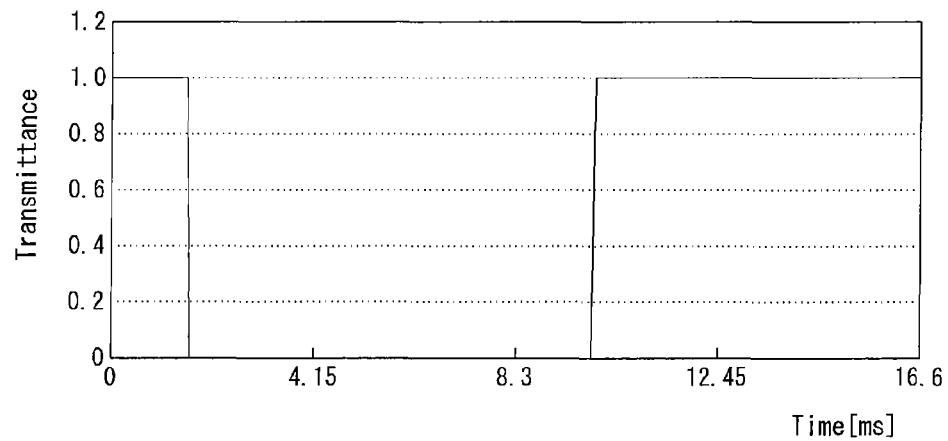
Figure 14:
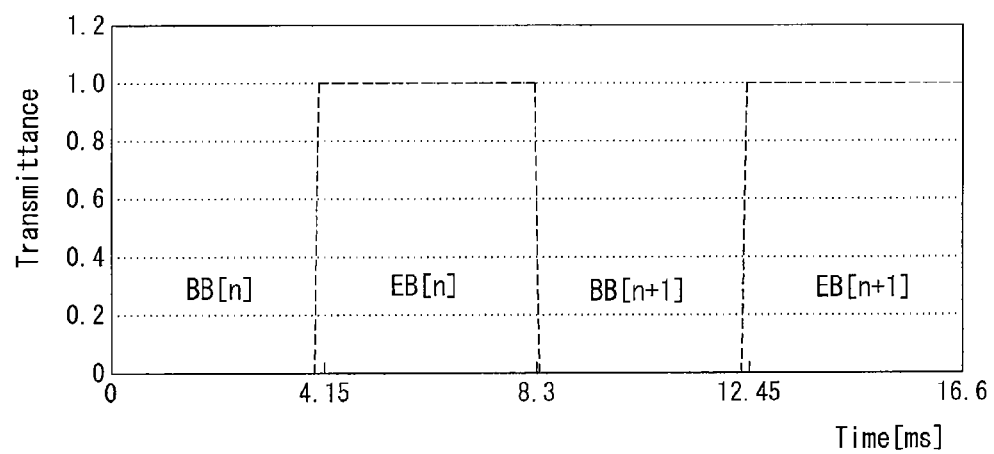
FIG. 14 is simulation waveform diagrams illustrating black/white response curves of the left eye/right eye in the polarization control panel and polarization glasses relative to the emission time of the backlight unit.
Figure 14:
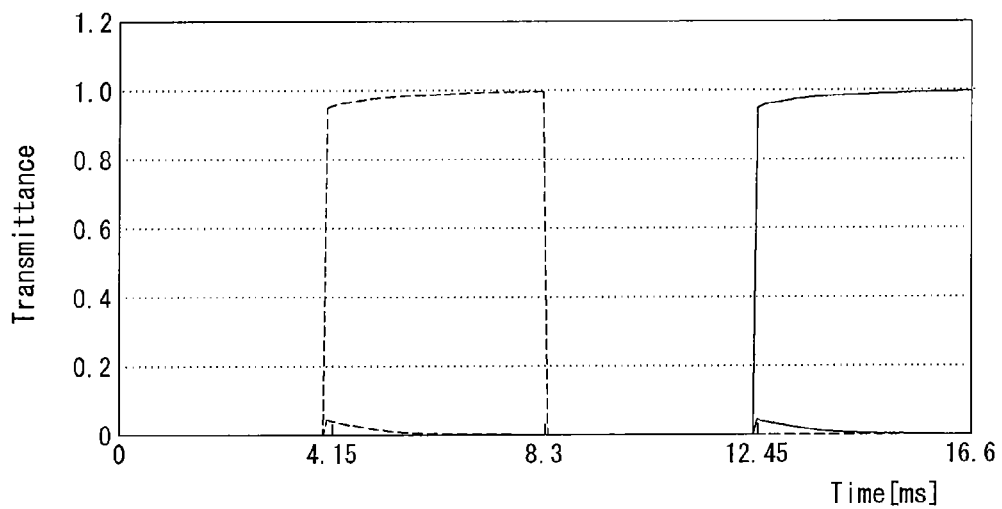
Figure 15:
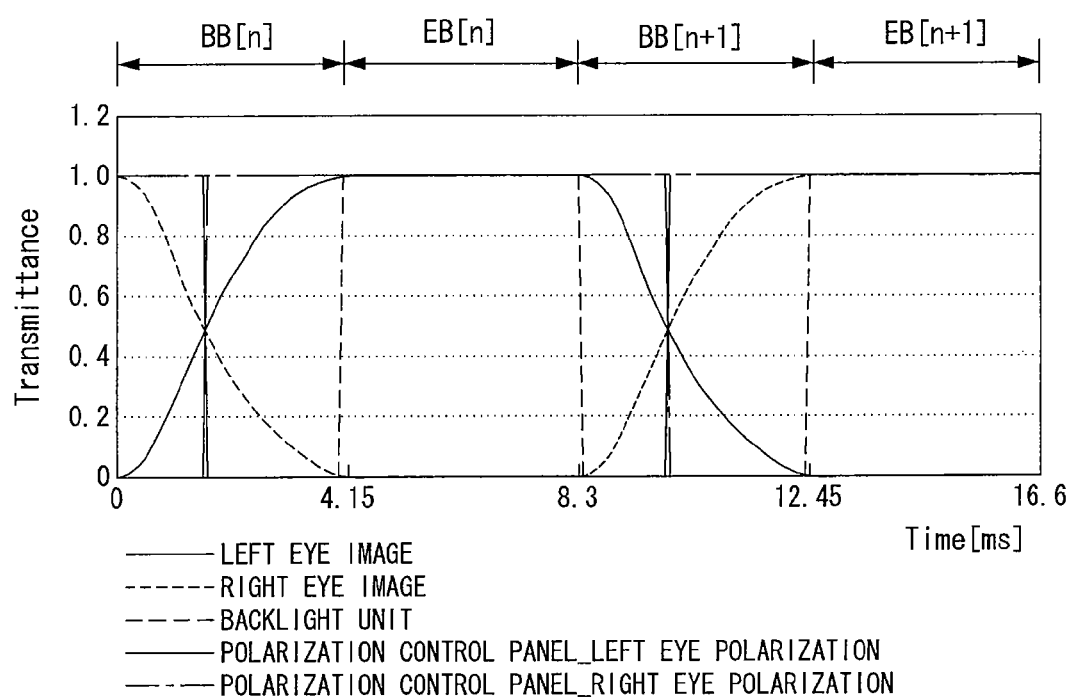
FIG. 15 is a simulation waveform diagram of the stereoscopic image display device obtained by multiplying the simulation waveform diagrams in FIGS. 12 to 14 by each other.

FIGS. 12 and 13 are simulation waveform diagrams illustrating switching response curves of the polarization glasses with respect to image test patterns displayed on the liquid crystal panel. FIG. 14 is simulation waveform diagrams illustrating black/white response curve of the left eye/right eye in the polarization control panel and polarization glasses relative to the emission time of the backlight unit. FIG. 15 is a simulation waveform diagram of the stereoscopic image display device obtained by multiplying the simulation waveform diagrams in FIGS. 12 to 14 by each other.

When a left eye white image test pattern and a right eye white image test pattern are alternately displayed on the liquid crystal panel PNL, the switching waveforms of the polarization glasses GLS in left eye and right eye white states are shown like those in FIGS. 12 and 13. At this time, as shown in FIG. 14, the backlight unit BLU is driven to be turned off at the black durations BB[n] to BB[n+2] corresponding to the durations where the crosstalk C/T is generated, and thereby total transmittances of the left eye and right eye in the polarization control panel ARP gives the following table 1.

TABLE 1

| Left Eye White | Left Eye Black | Right Eye Black | Right Eye White |
|---|---|---|---|
| 0.254877 | 0.003176 | 0.002947 | 0.250485 |

According to the simulation waveform diagram for the response curve of the polarization control panel ARP shown in FIG. 14, this embodiment can considerably reduce the crosstalk C/T as compared with a comparative example, as shown in table 2.

TABLE 2

| Comparative Example | Embodiment |
|---|---|
| 21.5% | 1.2% |

Here, the comparative example has the same configuration as this embodiment and the backlight unit BLU continues to be turned on, whereas the backlight unit BLU in this embodiment, as described above, is driven to be turned off for a constant time at the black durations BB[n] to BB[n+2] corresponding to the durations where the crosstalk C/T is generated.

The waveform diagram in FIG. 15 is obtained by multiplying the waveforms in FIGS. 12 to 14 by each other. It can be seen from FIG. 15 that the black durations BB[n] to BB[n+2] in this embodiment correspond to at least one of the durations where images displayed on the liquid crystal panel PNL are changed and the durations where the polarization states of the polarization control panel ARP are changed. Also, it can be seen that the black durations BB[n] to BB[n+2] in this embodiment correspond to at least one of the durations where the polarization states of the polarization control panel ARP are changed and the durations where the polarization states of the polarization glasses GLS are changed. Further, the black durations BB[n] to BB[n+2] in this embodiment correspond to at least one of the durations where the light leakage occurs in the polarization control panel ARP and the durations where the light leakage occurs in the polarization glasses GLS. Also, the black durations BB[n] to BB[n+2] in this embodiment correspond to the durations where the polarization state of the polarization control panel ARP is changed to the middle polarization durations between the left eye polarization and the right eye polarization.

According to this document, it is possible to provide the stereoscopic image display device in which the backlight unit is driven to be turned off at the black durations and thus the crosstalk generated by the coupling of the left eye image and the right eye image is reduced, thereby improving a stereoscopic vision.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims.

The invention claimed is:

1. A stereoscopic image display device which uses polarization glasses for stereoscopic image viewing, comprising:
    a liquid crystal panel which alternately displays a first image in a first frame and a second image in a second frame, wherein the first and the second images being changed at first transition durations of every frame;
    a polarization control panel, disposed over the liquid crystal panel:
        wherein the polarization control panel comprises an upper substrate and a lower substrate, and a liquid crystal layer formed between the upper substrate and the lower substrate, wherein a single body of common electrode is formed in the upper substrate and the single body of common electrode overlaps a plurality of scan line electrodes which are formed in a lower substrate,
        wherein a polarization state of the polarization control panel changes by a rotation of 90 degree at second transition durations of every frame;
    polarization glasses which enables stereoscopic viewing of the displayed first and the second images via the polarization control panel; and
    a backlight unit which provides lighting to the liquid crystal panel with periodic black durations, wherein during the black durations, the lighting provided to the liquid crystal panel are turned off, and the black durations corresponds to one of the first transition durations and the second durations, whichever is longer.

2. The stereoscopic image display device of claim 1, wherein the 90 degree rotation of the polarization state change of the polarization control panel is facilitated by supplying a three-step voltage level to the plurality of scan lines, wherein the three-step voltage level comprises a more positive voltage level, same voltage level and a more negative voltage level relative to a voltage level of the common electrode.

3. The stereoscopic image display device of claim 1, wherein the polarization glasses changes polarization states at third transition durations, and
    wherein the black durations correspond to at least one of the second transition durations and the third transition durations, whichever is longer.

4. The stereoscopic image display device of claim 1, wherein the black durations correspond to at least one of durations where light leakage occurs in the polarization control panel and durations where light leakage occurs in the polarization glasses.

5. The stereoscopic image display device of claim 1, wherein the black durations correspond to middle polarization durations where the polarization state of the polarization control panel is positioned between a left eye polarization and a right eye polarization.

6. The stereoscopic image display device of claim 1, wherein the black durations are moved along a scan direction in the liquid crystal panel.

7. The stereoscopic image display device of claim 1, wherein the black durations are moved by block unit along a scan direction in the liquid crystal panel.

8. The stereoscopic image display device of claim 1, wherein the backlight unit comprises light sources emitting lights by block unit.

9. The stereoscopic image display device of claim 8, wherein the number of blocks is at least ten.

10. The stereoscopic image display device of claim 1, wherein the backlight unit is driven in synchronization with at least one of the liquid crystal panel and the polarization control panel.

* * * * *